United States Patent
Lee et al.

(10) Patent No.: US 8,040,840 B2
(45) Date of Patent: Oct. 18, 2011

(54) METHOD OF MERGING CELLS IN COGNITIVE RADIO

(75) Inventors: Hyung-Jick Lee, Seongnam-si (KR);
Ho-Seok Lee, Anyang-si (KR);
Dae-Yong Sim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 781 days.

(21) Appl. No.: 12/112,025

(22) Filed: Apr. 30, 2008

(65) Prior Publication Data

US 2009/0017828 A1 Jan. 15, 2009

(30) Foreign Application Priority Data

Jul. 11, 2007 (KR) .................. 10-2007-0069576

(51) Int. Cl.
*H04W 4/00* (2009.01)
*H04W 72/00* (2009.01)
(52) U.S. Cl. ......... 370/328; 370/338; 455/454; 455/522
(58) Field of Classification Search .................. None
See application file for complete search history.

(56) References Cited

U.S. PATENT DOCUMENTS

| | | | |
|---|---|---|---|
| 7,065,576 B2 * | 6/2006 | Kamel et al. .................. 709/227 |
| 2004/0008654 A1 * | 1/2004 | Klein et al. ................... 370/338 |
| 2004/0106410 A1 * | 6/2004 | Choi et al. .................... 455/446 |
| 2007/0249340 A1 * | 10/2007 | Hiltunen et al. .............. 455/433 |
| 2008/0019423 A1 * | 1/2008 | Hu ................................ 375/141 |
| 2008/0102872 A1 * | 5/2008 | Liu ............................... 455/522 |
| 2008/0240145 A1 * | 10/2008 | Adamovsky et al. ......... 370/449 |
| 2009/0005043 A1 * | 1/2009 | Claussen et al. .............. 455/436 |
| 2010/0020732 A1 * | 1/2010 | Gaddam et al. ............... 370/310 |

FOREIGN PATENT DOCUMENTS

EP 1739988 A1 * 1/2007

OTHER PUBLICATIONS

Hu, Wendong, et al, "Dynamic Frequency Hopping Communities for Efficient IEEE 802.22 Operation", May 2007, IEEE Communications Magazine, pp. 80-87.*

* cited by examiner

*Primary Examiner* — Robert Scheibel
(74) *Attorney, Agent, or Firm* — Sughrue Mion, PLLC (57) ABSTRACT

A method of merging cells in cognitive radio is provided. The method includes: requesting base stations to merge cells, measuring service ranges of the merged cells using the base stations, and exchanging cell-merging information between the base stations.

22 Claims, 9 Drawing Sheets

| Message | DESCRIPTION |
|---|---|
| CellMerge_Req (510) | My BS ID, Power Level, Power Granularity, RngMeasure Order [INDICATED BY BS ID], Basis Channel #, Target Channel # (N) |
| CellMerge_Ack (520) | Accept/Reject |
| RngMeasure_Req (530) | My BS ID, Power Level, Bonded Channel Numbers (N) |
| RngMeasure_Rep (540) | My BS ID, Target BS ID, Number of CPE's not hearing CBP |
| CHBM_Req (550) | My BS ID, 1st BS ID, 2nd BS Id, 3rd BS ID, Bonding Channel numbers (N), Time duration |
| CHBM_Rsp (560) | My BS ID, Adjusted Time duration |
| CHBM_Ack (570) | My BS ID, Time duration, Merging Initiation Count |

METHOD OF MERGING CELLS IN COGNITIVE RADIO

CROSS-REFERENCE TO RELATED APPLICATION

This application claims priority from Korean Patent Application No. 10-2007-0069576 filed on Jul. 11, 2007 in the Korean Intellectual Property Office, the disclosure of which is incorporated herein by reference in its entirety.

BACKGROUND OF THE INVENTION

1. Field of the Invention

Apparatuses and methods consistent with the present invention relate to merging cells in cognitive radio, and more particularly, to merging cells involving merging adjacent cells in cognitive radio, and thus efficiently utilizing resources.

2. Description of the Related Art

As the use of wireless communication technology is increasingly required in daily life, various forms of wireless communication technology are being rapidly developed.

In particular, there is a sharp increase of services using wireless technologies, such as mobile communication, wireless local area network (WLAN), digital broadcasting, satellite communication, radio frequency identification (RFID)/ubiquitous sensor network (USN) and wireless broadband (WiBro). The diversification and increased use of wireless communication services are dramatically increasing the demand for limited frequency resources, thereby making the frequency resources more valuable. In order to efficiently use such valuable frequency resources, advanced countries are developing relevant technologies and conducting activities to implement frequency policies based on the technologies.

One of the technologies for efficiently using frequency resources is cognitive radio. Cognitive radio can detect an idle frequency, which is assigned but not used, and efficiently share the idle frequency.

Specifically, cognitive radio is a technology that automatically finds an unused frequency for each area and time and enables intended communication while protecting licensed radio stations nearby. Cognitive radio finds idle portions of the spectrum, determines a frequency bandwidth, a power level and a modulation scheme suitable for the environment, and uses the idle portion of the spectrum. Therefore, the limited frequency resources can be more efficiently used. Since 2004, the Institute of Electrical and Electronics Engineers (IEEE) has been trying to standardize cognitive radio technology using a television frequency band.

Specifically, the IEEE is implementing IEEE 802.22 using an ultra-high frequency (UHF) (channels 14 to 51) band, which is a high-quality frequency band. With little power, IEEE 802.22 can reach far while avoiding interference with incumbent users of public channels. Therefore, it can remove shadow areas in homes or offices.

IEEE 802.22 has a bandwidth of 6 MHz in the UHF band and increases throughput by bonding channels up to a maximum of three channels when necessary. In a cognitive radio environment, many cells overlap one another, and a usable frequency is limited. Therefore, some cells short of frequency resources may have difficulty securing frequency resources, thereby failing to satisfy quality of service for real-time data.

According to a conventional method suggested to satisfy quality of service in the cognitive radio environment, a base station short of frequency resources borrows frequency resources from another base station abundant with frequency resources. However, if this conventional method is used in an apartment building which is a densely populated form of housing, since a plurality of cells overlap one another, usable frequency resources are sharply reduced. Therefore, it is difficult to secure frequency resources through channel expansion and efficiently use a frequency spectrum. Furthermore, since the base station, which lends its frequency resources, can arbitrarily withdraw the frequency resources, service may be halted.

SUMMARY OF THE INVENTION

Aspects of the present invention provide a method of merging cells in cognitive radio in order to efficiently use insufficient resources.

However, the aspects of the present invention are not restricted to such. The above and other aspects of the present invention will become apparent to one of ordinary skill in the art to which the present invention pertains by referencing detailed descriptions of the present invention given below.

According to an aspect of the present invention, there is provided a method of merging cells in cognitive radio. The method includes: requesting base stations to merge cells, measuring service ranges of the merged cells using the base stations, and exchanging cell-merging information between the base stations.

BRIEF DESCRIPTION OF THE DRAWINGS

The above and other aspects of the present invention will become apparent by describing in detail exemplary embodiments thereof with reference to the attached drawings, in which.

DETAILED DESCRIPTION OF THE EXEMPLARY EMBODIMENTS

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements, and thus their description will be omitted.

Hereinafter, a method of merging cells in cognitive radio according to exemplary embodiments of the present invention will be described with reference to block diagrams or flowchart illustrations. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block of the flowchart illustrations may represent a module, segment, or portion of code, which comprises one or more executable instructions for implementing the specified logical function(s). It should also be noted that in some alternative implementations, the functions noted in the blocks may occur out of the order as shown in the exemplary embodiments. For example, two blocks shown in succession may in fact be executed substantially concurrently or the blocks may sometimes be executed in reverse order, depending upon the functionality involved.

Figure 1:
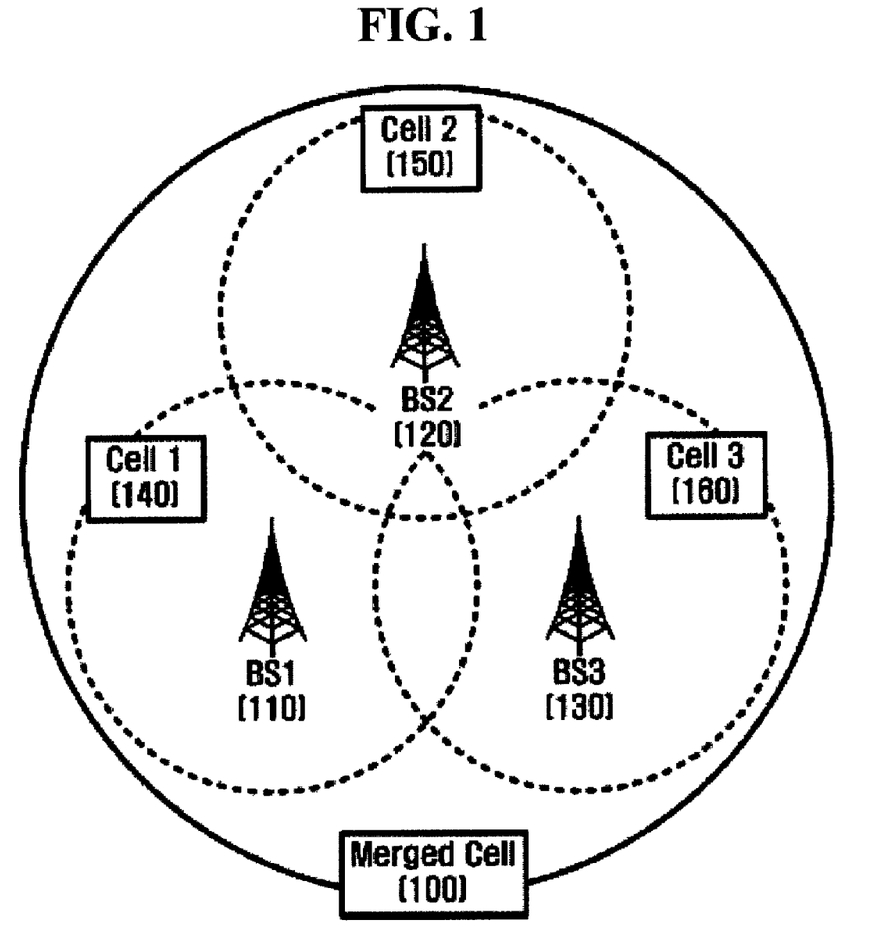
FIG. 1 is a schematic diagram illustrating a method of merging cells in cognitive radio according to an exemplary embodiment of the present invention.

FIG. 1 is a schematic diagram illustrating a method of merging cells in cognitive radio according to an exemplary embodiment of the present invention.

Referring to FIG. 1, a first cell 140 of a first base station 110, a second cell 150 of a second base station 120, and a third cell 160 of a third base station 130 in cognitive radio overlap one another. In order to increase throughput and quality of service when the first through third base stations 110 through 130 do not have available frequencies, the first through third cells 140 through 160 are merged into a single cell 100.

When the first through third base stations 110 through 130 intend to merge the first through third cells 140 through 160, they temporarily do so by expanding channels respectively used by the first through third cells 140 through 160. In this case, the base station that has a largest number of consumer premise equipments (CPEs) receiving signals, is determined to be a main base station of the merged cell 100. The other base stations are prioritized and used as backup base stations which replace the main base station when the main base station is not available.

The first through third cells 140 through 160 remain merged for a period of time mutually agreed upon by the first through third base stations 110 trough 130. After the period of time elapses, the merged cell 100 is split back into the first through third cells 140 through 160. The agreed period of time is strictly observed.

Figure 2:
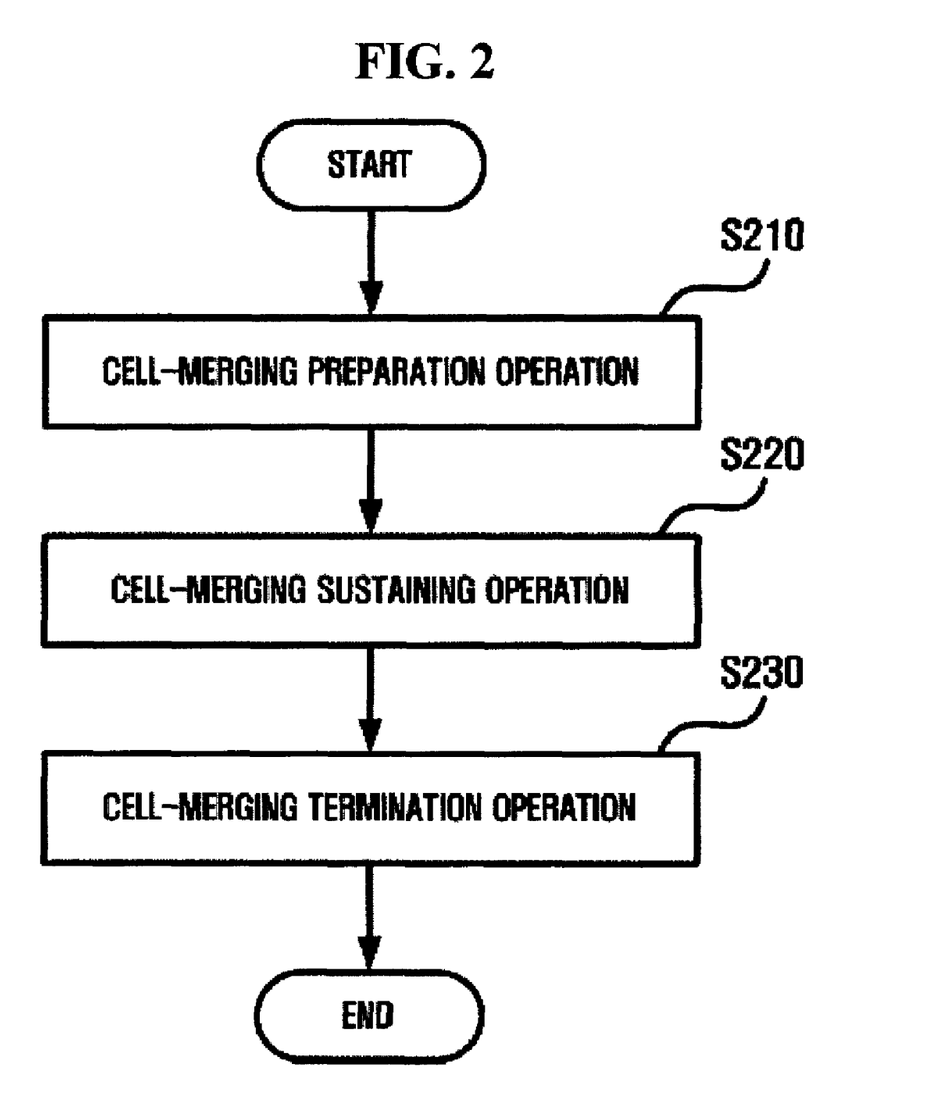
FIG. 2 is a schematic flowchart illustrating a method of merging cells in cognitive radio according to an exemplary embodiment of the present invention.

FIG. 2 is a schematic flowchart illustrating a method of merging cells in cognitive radio according to an exemplary embodiment of the present invention.

Referring to FIG. 2, the method of merging cells is broadly divided into a cell-merging preparation operation (operation S210), a cell-merging sustaining operation (operation S220), and a cell-merging termination operation (operation S230).

The cell-merging preparation operation (operation S210) includes requesting each base station to merge cells, measuring service ranges, ranking the base stations according to their measured service ranges, designating a main base station based on ranks of the base stations, determining a time period during which the cells will remain merged, and exchanging information regarding cell merging.

In the cell-merging sustaining operation (operation S220), the remaining time period is transmitted. In addition, when a main base station is not available, one of the base stations is selected according to ranks of the base stations and used as the main base station.

In the cell-merging-termination operation (operation S230), after the time during which the cells remain merged elapses, the channel is split back into the discrete cells.

Figure 3:
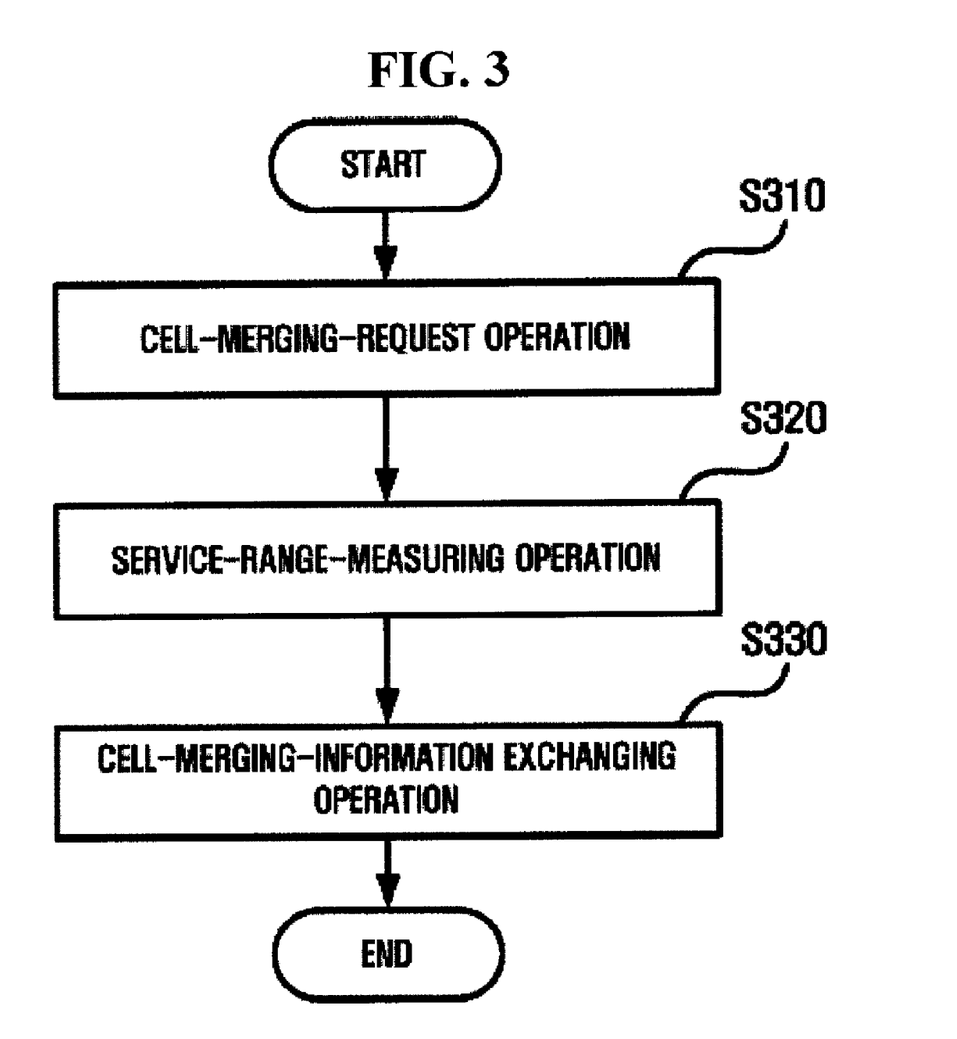
FIG. 3 is a schematic flowchart illustrating a cell-merging preparation operation included in the method of FIG. 2.

FIG. 3 is a schematic flowchart illustrating the cell-merging preparation operation (operation S210) included in the method of FIG. 2.

Referring to FIG. 3, the cell-merging preparation operation (operation S210) is broadly divided into a cell-merging-request operation (operation S310), a service-range-measuring operation (operation S320), and a cell-merging-information exchanging operation (operation S330).

In the cell-merging-request operation (operation S310), one of the base stations requests the other base stations to merge cells, and the other base stations respond to the request.

In the service-range-measuring operation (operation S320), the base stations request all CPEs to measure service ranges. If the CPEs report the results of measuring the service ranges to the base stations, the base stations collect the reports of the CPEs and adjust power levels accordingly. The base stations are ranked according to their measured service ranges, and a main base station is designated based on ranks of the base stations.

In the cell-merging-information-exchanging operation (operation S330), the base stations exchange information regarding their ranks and information at a starting point of cell merging and determine a time period, during which the cells will remain merged, through mutual consultation. In addition, the main base station starts a cell-merging-initiation count.

Figure 4:
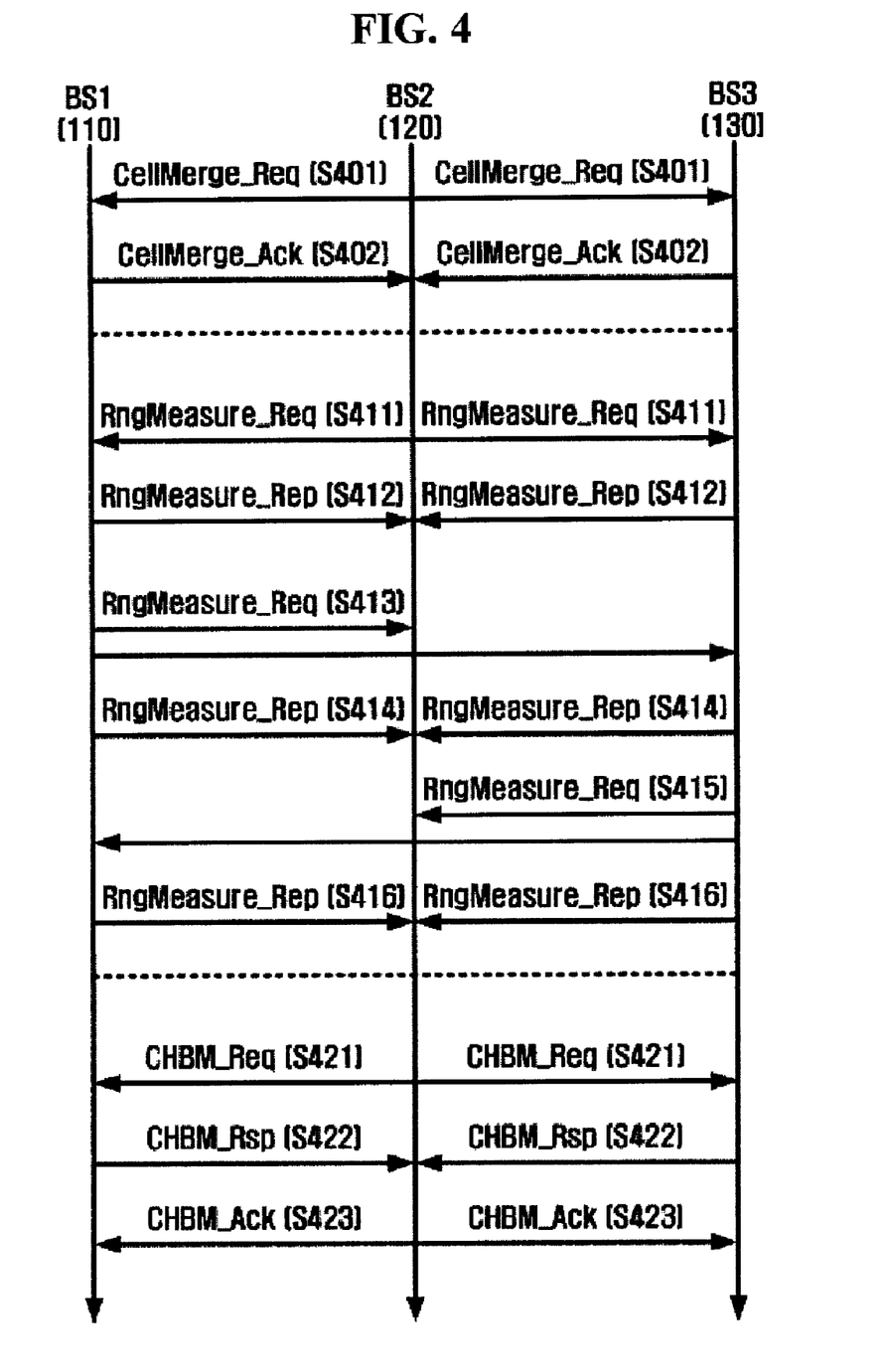
FIG. 4 is a diagram illustrating a signal-processing method needed to prepare for cell merging in cognitive radio according to an exemplary embodiment of the present invention.

FIG. 4 is a diagram illustrating a signal-processing method needed to prepare for cell merging in cognitive radio according to an exemplary embodiment of the present invention.

All base stations keep notifying one another that they can merge cells. In this case, each base station indicates spare capacity that it can provide. The base stations may exchange messages with one another using a coexistence beacon protocol (CBP) packet of a coexistence slot according to IEEE 802.22.

The CBP packet of the coexistence slot according to IEEE 802.22 is merely a method of achieving the goals of the present invention. Other methods of inter-cell communication may be used to achieve the goals of the present invention.

The CBP is a kind of a media access control (MAC) message and contains information regarding channel state and resource use of a cell, such as a number of a corresponding base station, resource requirements, an active channel set, and a candidate channel set.

If a specified CPE at a cell boundary receives a CBP packet from another base station in an adjacent cell, it reports the content of the received CBP packet to a base station which has jurisdiction over the CPE. Then, the base station transmits information regarding whether or not it allows cell merging to all CPEs under its jurisdiction. This information is repeatedly transmitted to other adjacent cells through CPEs at the cell boundary.

All messages described later may also be transmitted using the CPB packet.

Referring to FIG. 4, the second base station 120 requests the first base station 110 and the third base station 130 to merge cells (operation S401).

In this case, the second base station 120 checks the capacity required by the first base station 110 or the third base station 130 in advance. In addition, the second base station 120 arbitrarily determines 1 to N target cells to be merged. In the present exemplary embodiment, the second base station 120 determines three target cells including a cell to which it belongs.

Figure 5:
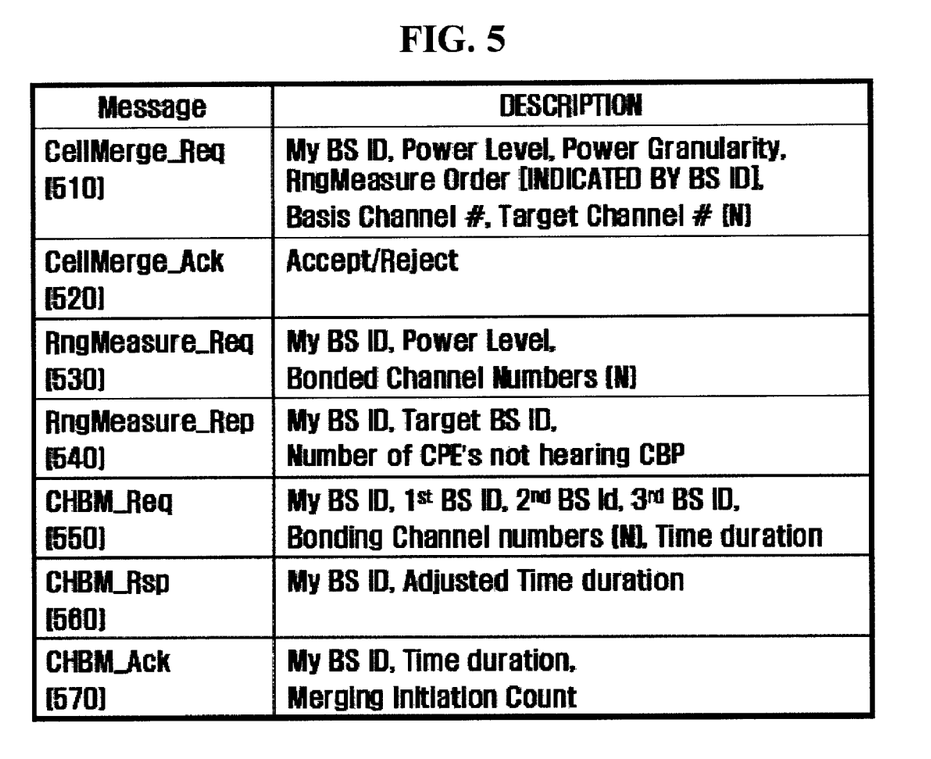
FIG. 5 illustrates formats of messages transmitted in the method of FIG. 2.

The second base station 120 includes information regarding a base station ID, a power level and a service-range-measuring order in a CellMerge_Req message and transmits the CellMerge_Req message accordingly. The detailed format of the CellMerge_Req message is as illustrated in FIG. 5.

The first base station 110 and the third base station 130 respond to the cell-merge request of the second base station 120 (operation S402).

If the first base station 110 or the third base station 130 rejects the cell-merge request, the second base station 120 selects another cell which volunteers to be merged and makes the cell-merge request again. If the first base station 110 and the second base station 120 accept the cell-merge request, the first through third base stations 110 through 130 enter a CBP packet reception mode to measure service ranges.

If respective service ranges of the second base station 120, the first base station 110 and the third base station 130 are to be sequentially measured according to the service-range-measuring order, the second base station 120 transmits a service-range-measurement request (operation S411). Specifically, the second base station 120 includes its base station ID and power level and the number of merged channels in an RngMeasure_Req message and transmits the RngMeasure_Req message accordingly. The detailed format of the RngMeasure_Req message is as illustrated in FIG. 5.

All CPEs, which receive the service-range-measurement request, report the reception of the service-range-measurement request to base stations, to which they belong, in a next upstream.

The first base station 110 and the third base station 130 transmit service-range measurement reports to the second base station 120 (operation S412). In this case, the first base station 110 and the third base station 130 inform the second base station 120 of the number of CPEs which have not reported the reception of the service-range-measurement request.

The first base station 110 transmits a service-range-measurement request (operation S413) according to the service-range-measuring order. As described above, the first base station 110 includes its base station ID and power level and bonded channel numbers in a RngMeasure_Req message. The detailed format of the RngMeasure_Req message is as illustrated in FIG. 5.

All CPEs that receive the service-range-measurement request report the reception of the service-range-measurement request to base stations to which they belong in the next upstream.

The first base station 110 and the third base station 130 transmit service-range measurement reports to the second base station 120 (operation S414). Since the second base station 120 collects the reports on the reception of the service-range-measurement request, the first base station 110 and the third base station 130 inform the second base station 120 of the number of CPEs which have not responded to the service-range-measurement request.

According to the service-range-measuring order, the third base station 130 transmits a service-range-measurement request (operation S415), and the first base station 110 and the third base station 130 transmit service-range measurement reports to the second base station 120 (operation S416). Detailed operations are as described above.

While the power level is increased, the above operations are repeated until all CPEs in all cells to which the first through third base stations 110 through 130 belong receive the service-range-measurement request, and report the reception of the service-range-measurement request.

The second base station 120 ranks the first through third base stations 110 through 130 based on the results of measuring the service ranges. Specifically, the second base station 120 ranks the first through third base stations 110 through 130 according to whether all CPEs have reported on the reception of the service-range-measurement request of each of the first through third base stations 110 through 130 and according to the size of the merged cell, from smallest to largest. This is because quality of service can be guaranteed using less power when all CPEs have received the service-range-measurement request from a base station and when the size of the merged cell is smaller.

The second base station 120 requests the first base station 110 and the third base station 130 to provide cell-merging information (operation S421). In this case, a transmitted CHBM_Req message includes the determined ranks of the first through third base stations 110 through 130, bonded channel numbers, and desired time period during which the cells will remain merged. The detailed format of the CHBM_Req message is as illustrated in FIG. 5.

The first base station 110 and the third base station 130 transmit their desired time periods to the second base station 120 with reference to the time period desired by the second base station 120 (operation S422).

The second base station 120 selects the shortest period of the time periods desired by the first through third base stations 110 through 130, and transmits cell-merging information to the first base station 110 and the third base station 130 (operation S423). A CHBM_Ack message that is transmitted here includes determined time period and a cell-merging initiation point.

A main base station ranking highest transmits a merging-initiation count to the other base stations until cell merging is initiated. If the merging-initiation count is one, three cells from a next frame are regarded as being merged.

Each of the above operations is resumed from the beginning when a timer expires.

FIG. 5 illustrates the formats of messages transmitted in the method of FIG. 2.

Referring to FIG. 5, a CellMerge_Req message 510 includes a base station ID (my BS ID), a power level (or power granularity), a service-range-measuring order (Rng-Meaure order), and the like. A CellMerge_Ack message 520 includes information regarding whether cell merging is accepted or rejected.

The RngMeasure_Req message 530 includes a base station ID (my BS ID), a power level, and bonded channel numbers. A RngMeasure_Rep message 540 includes a base station ID (my BS ID), a target base station ID, and the number of CPEs not hearing a CBP.

The CHBM_Req message 550 includes determined ranks of base stations (a first BS ID, a second BS ID, and a third BS ID), bonded channel numbers, and a desired time period. The CHBM_Rsp message 560 includes a desired time period, and the CHBM_Ack message 570 includes an adjusted time period and a merging-initiation count.

Figure 6:
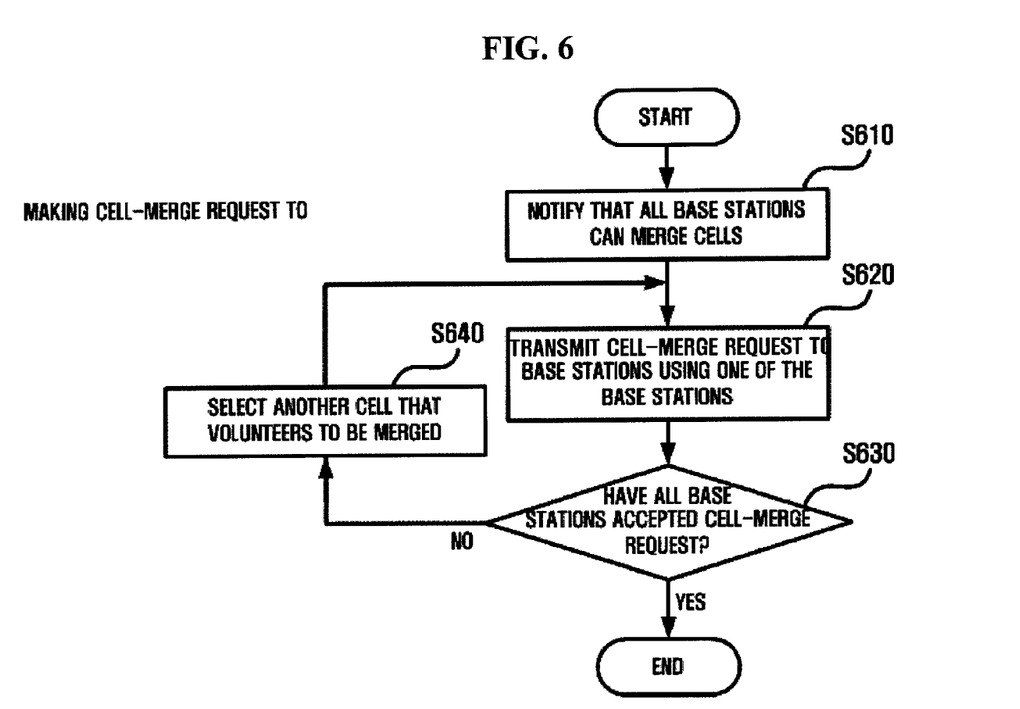
FIG. 6 is a flowchart illustrating a method of making a cell-merge request in cognitive radio according to an exemplary embodiment of the present invention.

FIG. 6 is a flowchart illustrating a method of making a cell-merge request in cognitive radio according to an exemplary embodiment of the present invention.

Referring to FIG. 6, all base stations notify one another about whether they can merge cells through a CBP packet of a coexistence slot (operation S610). In this case, each of the base stations indicates spare capacity that it can provide.

One of the base stations requests the other base stations to merge the cells (operation S620). In the present exemplary embodiment, the second base station 120 requests the first and third base stations 110 and 130 to merge the cells. The second base station 120 checks capacity required by the first base station 110 or the third base station 130 in advance and arbitrarily determines 1 to N target cells to be merged. In the present exemplary embodiment, the second base station 120 determines three target cells including a cell to which it belongs. The second base station 120 includes information, such as its base station ID and power level and a service-range-measuring order, in the CellMerge_Req message 510 and transmits the CellMerge_Req message 510 accordingly.

The base stations which receive the cell-merge request respond to the cell-merge request, and it is determined whether all base stations have accepted the cell-merge request (operation S630). Specifically, the base stations which receive the cell-merge request transmit the CellMerge_Ack message 520 indicating whether they accept or reject the cell-merge request to the base station that made the cell-merge request. In the present exemplary embodiment, the first base station 110 and the third base station 130 respond to the cell-merge request from the second base station 120. If all base stations accept the cell-merge request, they enter a CBP packet reception mode to measure service ranges.

If any one of the base stations rejects the cell-merge request, the base station that made the cell-merge request selects another cell which volunteers to be merged (operation S640). Then, the base station which made the cell-merge request makes the cell-merge request again to the selected cell (operation S620).

Figure 7:
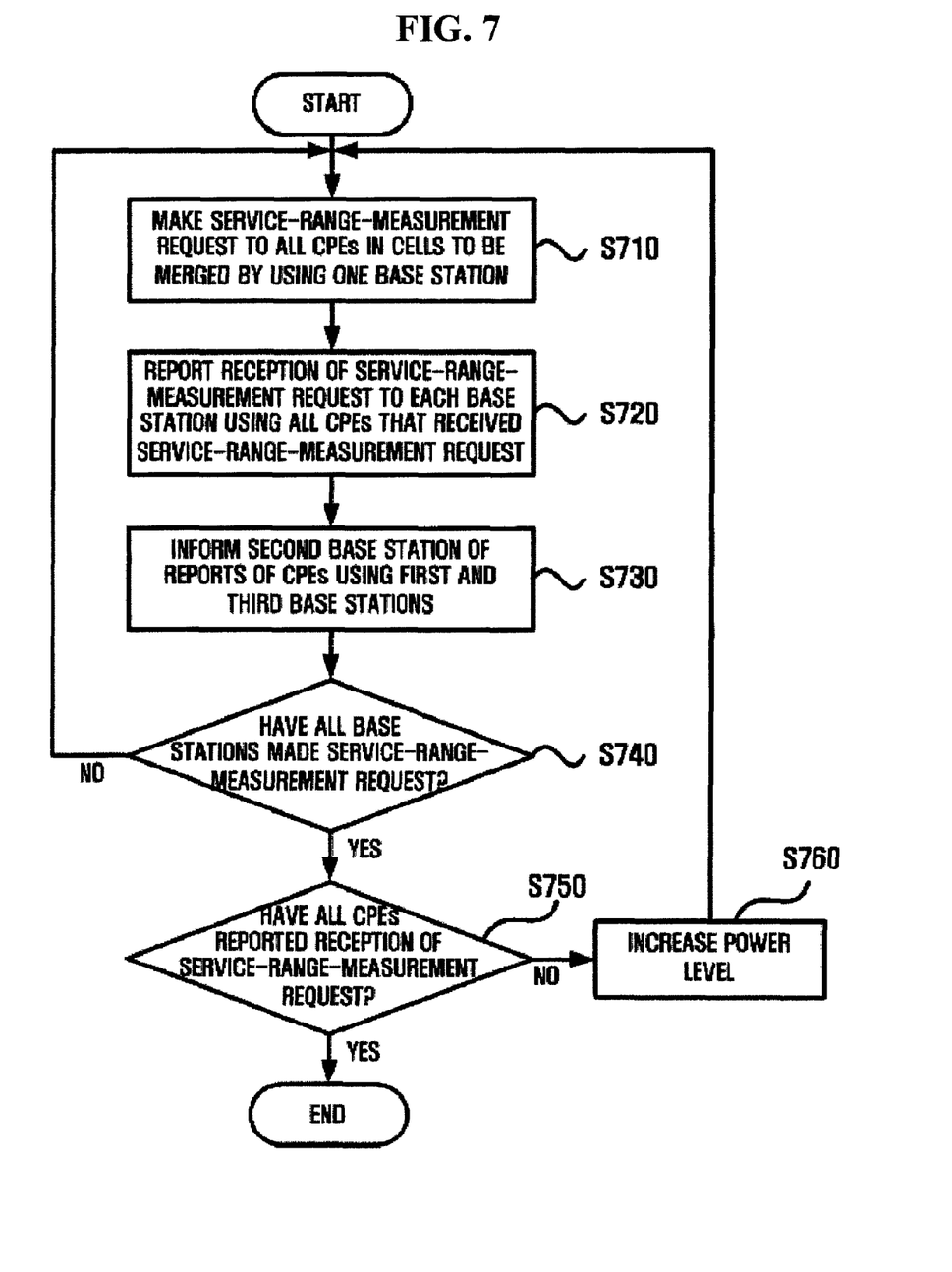
FIG. 7 is a flowchart illustrating a method of measuring service ranges in order to merge cells in cognitive radio according to an exemplary embodiment of the present invention.

FIG. 7 is a flowchart illustrating a method of measuring service ranges in order to merge cells in cognitive radio according to an exemplary embodiment of the present invention.

Referring to FIG. 7, according to the service-range-measuring order, a base station (e.g., the second base station 120) transmits a service-range-measurement request to all CPEs in cells that are to be merged (operation S710). The RngMeasure_Req message 530 transmitted here includes a base station ID, a power level, and bonded channel numbers.

All CPEs which receive the service-range-measurement request report the reception of the service-range-measurement request to base stations to which they belong, in a next upstream (operation S720).

The first base station 110 and the third base station 130 transmit service-range measurement reports to the second base station 120 (operation S730). The first base station 110 and the third base station 130 report to the second base station 120 the number of CPEs that have not reported the reception of the service-range-measurement request through the RngMeasure_Rep message 540.

The second base station 120 determines whether all base stations have made the service-range-measurement request (operation S740). When there is a base station which has not made the service-range-measurement request, a next base station in the service-range-measuring order makes the service-range-measurement request (operation S710).

If it is determined that all of the first through third base stations 110 through 130 have made the service-range-measurement request, the second base station 120 determines whether all CPEs have reported the reception of the service-range-measurement request (operation S750). Specifically, the second base station 120 determines whether all CPEs have reported the reception of the service-range-measurement request based on the reports of the first and third base stations 110 and 130. If all CPEs have reported the reception of the service-range-measurement request, service-range measurement is terminated, and the first through third base stations 110 through 130 are ranked according to the results of the service-range measurement.

If it is determined that all CPEs have not reported the reception of the service-range-measurement request, each of the first through third base stations 110 through 130 increases its power level (operation S760). After increasing the power level, each of the first through third base stations 110 through 130 makes the service-range-measurement request again (operation S710).

Figure 8:
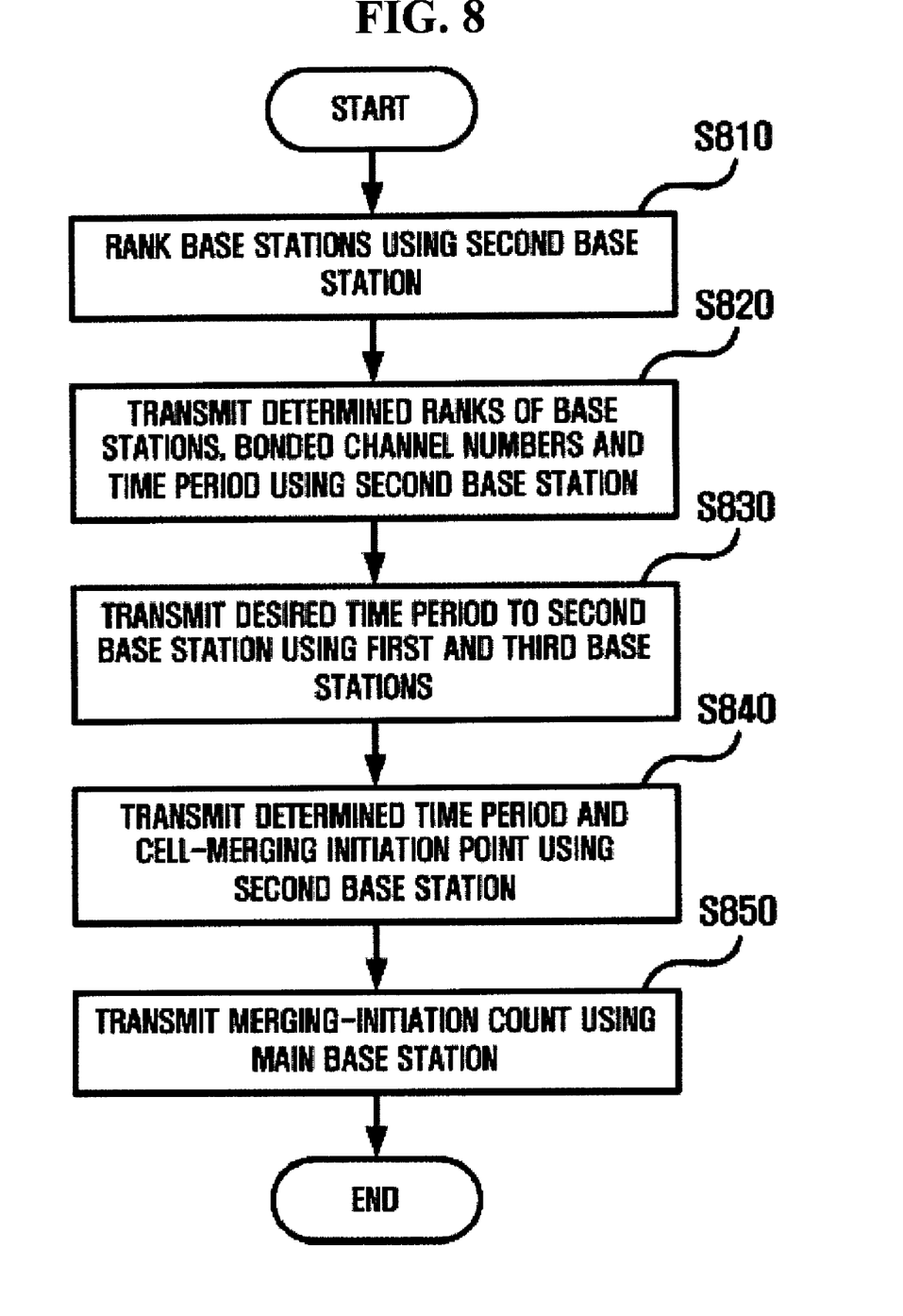
FIG. 8 is a flowchart illustrating a method of exchanging cell-merging information in cognitive radio according to an exemplary embodiment of the present invention.

FIG. 8 is a flowchart illustrating a method of exchanging cell-merging information in cognitive radio according to an exemplary embodiment of the present invention.

Referring to FIG. 8, the second base station 120 ranks the first through third base stations 110 through 130 based on the result of service-range measurement (operation S810). Specifically, the second base station 120 ranks the first through third base stations 110 through 130 according to whether all CPEs have reported the reception of the service-range-measurement request of each of the first through third base stations 110 through 130 and according to the size of the merged cell (of each of the first through third base stations 110 through 130), from smallest to largest. This is because quality of service can be guaranteed using less power when all CPEs have received the service-range-measurement request from a base station and when the size of the merged cell is smaller.

The second base station 120 transmits the CHBM_Req message 550, which includes the determined ranks of the first through third base stations 110 through 130, bonded channel numbers, and desired time period during which the cells will remain merged, to the first base station 110 and the third base station 130 (operation S820).

The first and third base stations 110 and 130 include their desired time periods in the CHBM_Rsp message 560 with reference to the time period desired by the second base station 120, and transmit the CHBM_Rsp message 560 to the second base station 120 (operation S830).

The second base station 120 selects the shortest one of the time periods desired by the first through third base stations 110 through 130 and transmits the CHBM_Ack message 570, which includes determined time period and a cell-merging initiation point, to the first base station 110 and the third base station 130 (operation S840).

A main base station with the highest ranking transmits a merging-initiation count to the other base stations until cell-merging is initiated (operation S850). If the merging-initiation count is one, three cells from a next frame are regarded as being merged.

Figure 9:
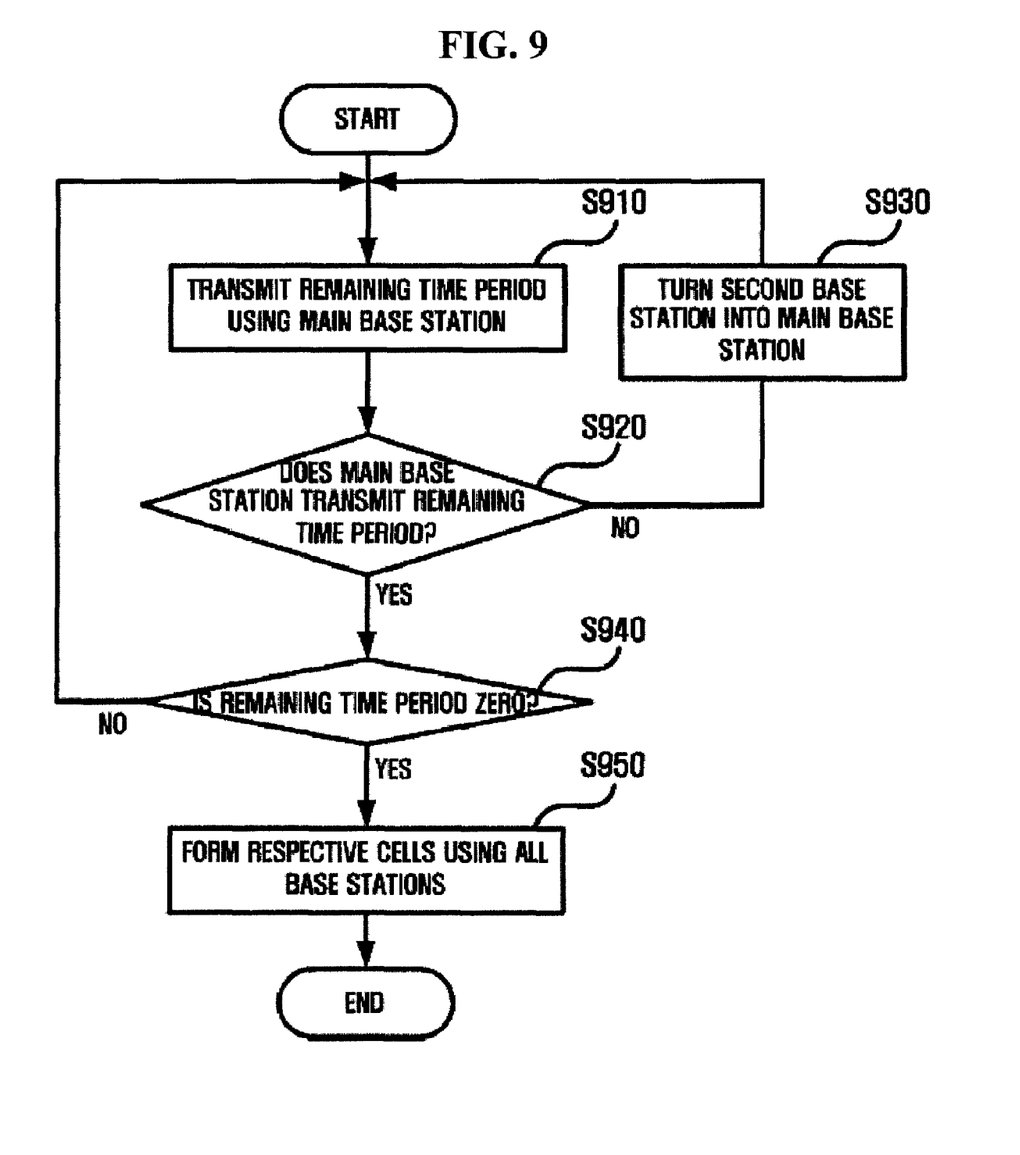
FIG. 9 is a flowchart illustrating a method of sustaining and terminating cell merging in cognitive radio according to an exemplary embodiment of the present invention.

FIG. 9 is a flowchart illustrating a method of sustaining and terminating cell merging in cognitive radio according to an exemplary embodiment of the present invention.

Referring to FIG. 9, a main base station ranking highest transmits the remaining time period during which cells remain merged (operation S910). Specifically, the main base station includes the remaining time period in additional information periodically transmitted to each base station, such as Superframe Control Header (SCH), Downstream Channel Descriptor (DCD) or Downstream Map (DS-MAP) according to IEEE 802.22, and transmits the additional information through merged channels. If the remaining time period of SCH is 1, cell separation occurs in a next superframe. If the remaining time period of DCD or DS-MAP is 1, cell separation occurs in a next frame.

Base stations and CPEs in the merged cells examine whether the main base station has transmitted the remaining time period (operation S920). If the main base station has not transmitted the remaining time period, a base station ranking second becomes the main base station (operation S930). In this case, the new base station guarantees the original remaining time period since a period of time during which the previous main base station was down is not subtracted from the original remaining time period.

If the main base station transmits the remaining time period, the base stations and the CPEs in the merged cells determine whether the remaining time period is zero (operation S940). If the remaining time period is not zero, the main base station subtracts 1 from the remaining time period and transmits the result (operation S910).

If the remaining time period is zero, the time period during which the cells remain merged expires, and all base stations form their respective cells (operation S950). Accordingly, cell merging is terminated.

As described above, a method of merging cells in cognitive radio according to exemplary embodiments of the present invention may provide at least one of the following advantages.

First, the problem of service interruption due to arbitrary withdrawal of frequency resources in a conventional method of borrowing frequency resources in cognitive radio can be solved.

Second, channel expansion is possible even when there is no available channel.

Third, since bandwidth can be expanded by merging cells, services that could not be provided on a single channel can now be provided.

Fourth, a cell into which the cells are merged rearranges traffic between conventional services, thereby increasing the efficiency of frequency use.

However, the effects of the present invention are not restricted to that set forth herein. The above and other effects of the present invention will become apparent to one of ordinary skill in the art to which the present invention pertains by referencing the claims.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of merging cells in cognitive radio, the method comprising:
   requesting base stations to merge cells;
   measuring service ranges of merged cells using the base stations; and
   exchanging cell-merging information between the base stations,
   wherein the measuring comprises:
   transmitting a service-range-measurement request from each of the base stations;
   collecting a report of each consumer premise equipment (CPE) about reception of the service-range-measurement request and adjusting a power level of each base station; and
   ranking the base stations according to the measured service ranges.

2. The method of claim 1, wherein the requesting comprises:
   notifying that the base stations can merge the cells;
   transmitting a cell-merge request to the base stations from one of the base stations; and
   responding to the cell-merge request using the base stations that received the cell-merge request.

3. The method of claim 2, wherein the notifying comprises the base stations notifying one another that the base stations can merge the cells by indicating spare capacity that can be provided by the base stations.

4. The method of claim 2, wherein, in the transmitting the cell-merge request, the one of the base stations checks capacity required by each base station, determines a number of cells to be merged, and transmits the cell-merge request to base stations in cells that are to be merged.

5. The method of claim 2, wherein the requesting further comprises selecting a new cell using the base station which transmitted the cell-merge request if one of the base stations that received the cell-merge request rejects the cell-merge request.

6. The method of claim 2, wherein the cell-merge request comprises a base station identifier of the one of the base stations which transmitted the cell-merge request, a power level of the one of the base stations, and a service-range-measuring order.

7. The method of claim 1, wherein the base stations sequentially transmit the service-range-measurement request according to a service-range-measuring order included in a cell-merge request for requesting the base stations to merge cells.

8. The method of claim 1, wherein the service-range-measurement request message comprises a base station identifier of a base station which makes the service-range-measurement request, a power level of the base station which makes the service-range-measurement request, and a number of merged channels.

9. The method of claim 1, wherein the collecting comprises:
   reporting to one of the base stations a number representative of the number of CPEs that have not received the service-range-measurement request using the base stations;
   examining whether there are CPEs which have not received the service-range-measurement request; and
   increasing the power level of each base station.

10. The method of claim 1, wherein the base stations are ranked according to whether all CPEs have reported on the reception of the service-range-measurement request of each base station.

11. The method of claim 1, wherein the base stations are ranked according to whether all CPEs have reported on the reception of the service-range-measurement request of each base station and according to a size of each merged cell of each base station, from smallest to largest.

12. The method of claim 1, wherein the measuring the service ranges further comprises determining whether all base stations have made the service-range-measurement request.

13. The method of claim 1, wherein the exchanging comprises:
   determining a time period during which the cells will remain merged, using the base stations; and
   transmitting the cell-merging information, which contains the time period, using one of the base stations.

14. The method of claim 13, wherein a shortest time period of time periods desired by the base stations is determined to be the time period during which the cells will remain merged.

15. The method of claim 13, wherein the transmitted cell-merging information comprises determined ranks of the base stations and bonded channel numbers.

16. The method of claim 13, wherein the exchanging further comprises transmitting a merging-initiation count using a base station ranked the highest according to the measured service ranges.

17. The method of claim 1, wherein the requesting, the measuring and the exchanging are each performed using a communication mechanism between the cells.

18. The method of claim 1, wherein the requesting, the measuring and the exchanging are each performed using a coexistence beacon protocol (CBP) packet of a coexistence slot according to the Institute of Electrical and Electronics Engineers (IEEE) 802.22 standard.

19. The method of claim 1, further comprising:
   transmitting a remaining time period of merge time to the base stations using a base station ranked the highest according to the measured service ranges; and
   forming respective cells of the merged cell using the base stations after the remaining time period expires.

20. The method of claim 19, wherein the remaining time period is transmitted using information that is periodically transmitted.

21. The method of claim 19, wherein the remaining time period is transmitted using at least one of Superframe Control Header (SCH), Downstream Channel Descriptor (DCD) and Downstream Map (DS-MAP) according to the IEEE 802.22 standard.

22. The method of claim 19, further comprising:
   determining whether a main base station transmits the remaining time period; and
   changing a designations of the main base station according to the ranking of the base stations determined according to the measured service ranges.

* * * * *